Sept. 9, 1941.  R. H. WILMETH  2,255,372
INDICATING APPARATUS
Filed July 6, 1939  3 Sheets-Sheet 1

Inventor:
Roscoe H. Wilmeth
By Brown, Jackson, Boettcher & Dienner
Attys.

Fig. 2B.

Sept. 9, 1941.  R. H. WILMETH  2,255,372
INDICATING APPARATUS
Filed July 6, 1939   3 Sheets—Sheet 3

Inventor:
Roscoe H. Wilmeth.
By Brown, Jackson, Boettcher & Dienner
Attys.

Patented Sept. 9, 1941

2,255,372

UNITED STATES PATENT OFFICE 2,255,372

INDICATING APPARATUS

Roscoe H. Wilmeth, Springfield, Ill., assignor to Sangamo Electric Company, Springfield, Ill., a corporation of Illinois Application July 6, 1939, Serial No. 283,127

17 Claims. (Cl. 171—34)

My invention relates, generally, to integrating apparatus and it has particular relation to apparatus for integrating maximum demands of a varying quantity.

One well known mechanism for integrating a varying quantity is a watthour meter. It is provided with electromagnets that are energized in accordance with the voltage across and the current flowing in an electrical circuit. The electromagnets are arranged to rotate a disc, the number of revolutions of which corresponds to the quantity of electrical energy that has been used. The number of revolutions of the disc is counted by suitably intergeared pointers operating over scales which are calibrated in suitable units. For measuring electrical energy, the scales are calibrated in units of watthours or kilowatt hours. If the pointers are rotated in accordance with any other varying quantity then, of course, the calibration would be in different units. For purposes of illustration, it will be understood that a watthour mechanism is employed as showing one application for the present invention. However, other applications will be apparent to those skilled in the art.

An integrating meter, such as a watthour meter, measures the total energy that has been used during a period, such as a month. However, it gives no indication of how much energy was being used at any one time or within what is known as a demand interval, which usually is relatively short, such as fifteen or thirty minutes. It is necessary for the power company to provide sufficient generating apparatus and a distribution system having sufficient capacity to take care of the maximum demand for energy, even though this amount of energy is required relatively infrequently, for example, only once or twice during a demand period, such as a month. Therefore, it is desirable to provide some means for indicating the maximum demand of a customer during a demand period in order to obtain a proper basis for charging him for the amount of service that he has required.

In the past, an indication of the maximum demand of a customer has been provided by adding to the usual watthour meter and register a maximum demand pointer and a scale relative to which it can move. A pusher arm that is periodically reset, for example, every fifteen or thirty minutes, constituting a demand interval, is arranged to move the maximum demand pointer along the scale. The pointer is of the friction type and tends to remain in the position to which it is operated by the pusher arm. The position of the maximum demand pointer relative to the scale indicates the maximum demand that has been applied to the system by a particular customer during a demand period, such as a month. At the end of the demand period, a meter reader notes the position of the maximum demand pointer relative to the scale and then resets it to its initial or zero position for the next demand period.

In many instances the penalty for exceeding a certain maximum demand during the demand period is quite severe. Therefore, it is necessary to insure that the maximum demand has been properly noted by the meter reader.

It will be apparent that, once the maximum demand pointer has been reset, it is impossible to subsequently check the accuracy of the record made by the meter reader in the event that a dispute arises between the customer and the power company. It is highly desirable that some means be provided for preserving the maximum demand indication for some time after the meter is read, for example, during the next demand period, so that the reading can be checked if it becomes necessary to do so. It is to the provision of a mechanism for preserving this reading that the present invention is particularly addressed.

Therefore, it is an object of my invention, generally stated, to provide an improved form of cumulative maximum demand register.

An object of my invention is to add to the total of the previous maximum demands the maximum demand that has occurred during a succeeding demand period, the addition being effected independently of the resetting of the demand member that is advanced during the demand period.

Another object of my invention is to advance one or more staffs during a demand period to positions corresponding to the maximum demand during a demand interval in the period and then, at the end of the demand period, to advance one or more pointers along scales to positions corresponding to the positions to which the staff or staffs have been advanced.

Still another object of my invention is to block movement of the staffs while the pointers are being advanced.

A further object of my invention is to prevent a subsequent advance of the pointers until a predetermined interval has elapsed after the preceding advance thereof.

A still further object of the invention is to compensate for back lash in the gear train between the demand member and the staffs, in order to insure accuracy of integration.

Other objects of my invention will, in part, be obvious and, in part, appear hereinafter.

My invention, accordingly, is disclosed in the embodiment thereof shown in the accompanying drawings, and it comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which—

Figures 1, 2A:
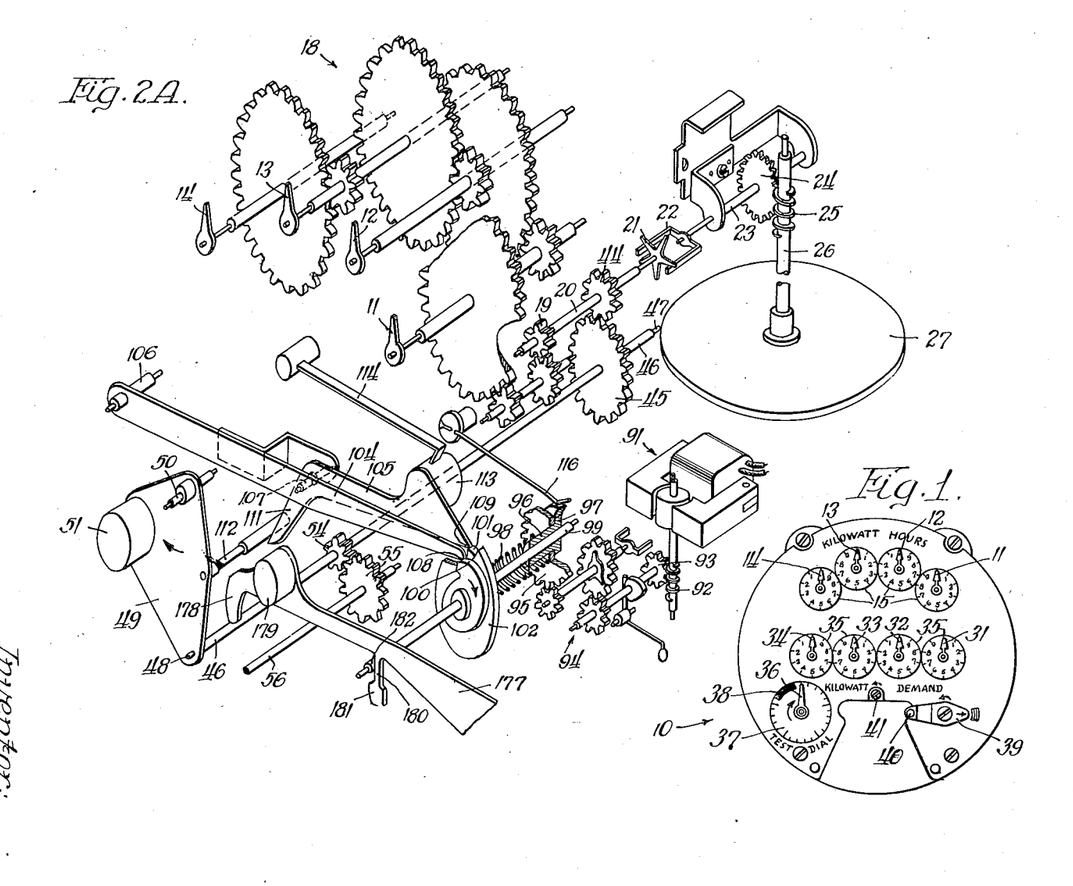
Figure 1 is a view, in front elevation, of the face of a cumulative maximum demand register constructed in accordance with the present invention.
Figures 2A and 2B, taken together, are isometric views of the parts making up the cumulative demand register, the relationship of the parts being somewhat diagrammatic and the scale for Figure 2A being slightly larger than the scale for Figure 2B in order to show the relationship of the parts as clearly as possible.

Referring now particularly to Figure 1 of the drawings, it will be observed that the reference character 10 designates, generally, a cumulative maximum demand register that is arranged to be substituted for the usual integrating register of a meter, such as a watthour meter, that is employed for measuring a varying quantity. The register 10 is provided with pointers 11, 12, 13 and 14, operable relative to circles or scales 15 for integrating watthours or kilowatt hours, as in the usual meter construction.

In Figure 2A of the drawings it will be observed that a gear train, shown generally at 18, is provided for rotating the pointers 11, 12, 13 and 14 in the proper relationship. The gear train 18 is driven by a pinion 19 on a shaft 20 that is provided with a star wheel 21 with which a dog 22, carried by a shaft 23, has driving engagement. The shaft 23 is provided with a worm wheel 24 that is driven by a worm 25 on a meter spindle 26 which supports the usual disc 27 of a watthour meter. The disc 27, as previously indicated, is caused to rotate at a speed depending upon the rate at which energy is being used in the circuit to which the windings of the electromagnets are connected. It will be understood that the meter spindle 26 may be driven by any other suitable means which operates as a function of a varying quantity, certain characteristics of which it is desired to measure.

As has been previously set forth, the indication that is provided by the pointers 11, 12, 13 and 14 does not tell the whole story as to the demand that has occurred on the system. All that they show by their positions relative to the circles or scales 15 is the total amount of energy that has flowed in the circuit at the time that they are read. They cannot, of course, give any indication of the demand at any particular time.

For the purpose of providing an indication of the maximum demand during a demand period that has occurred in any demand interval therein, and also to provide an indication that will remain unchanged throughout the next demand period, demand pointers 31, 32, 33 and 34 are provided. These pointers are arranged to rotate relative to demand circles or scales 35 to provide the indication of maximum demand.

It is desirable that the meter reader have some indication of the amount of the maximum demand that has occurred in the preceding demand period. For this purpose a test dial pointer 36 is provided and is arranged to rotate relative to a test scale 37 which may be calibrated in any suitable arbitrary units. Near the end of the scale 37 there is provided a specially marked portion 38 which, when the test dial pointer 36 has been moved over it, shows to the meter reader that the maximum demand capacity of the register 10 has been exceeded during the previous demand period. As will be readily understood, suitable changes are then made in the register 10 or a new one is substituted, or other changes are made in order to provide for properly registering the maximum demand that is likely to occur.

It will be understood that the demand pointers 31, 32, 33 and 34 remain in the positions to which they have been advanced at the end of each demand period. The difference between the new reading and the previous reading gives the maximum demand that has occurred in a demand interval during the previous demand period. For the purpose of advancing the demand pointers 31, 32, 33 and 34, for restoring the test dial pointer 36 to its initial position, and for performing several other functions which will be presently described, a manual reset arm 39 is provided having a lug 40 at one end for engagement by a suitable manual reset mechanism which is customarily located in the cover of the meter. Since the manual reset mechanism in the cover is old and well known, it is not shown or described herein. It will be understood that it is preferably of the type which can be operated in one direction only and that it is arranged to be sealed to prevent unauthorized operation.

After certain test operations have been completed and the demand pointers 31, 32, 33 and 34 have been advanced during the test, it is desirable to restore them to their previous positions with respect to the demand circles or scales 35. For this purpose a reset member 41 is provided having a slotted head for engagement by a screwdriver. Rotation of the reset member 41 in the direction indicated by the arrow associated therewith will cause a reverse rotation of the demand pointers 31, 32, 33 and 34, as will be described in detail hereinafter.

It will be recalled that the pinion 19, Figure 2A, which drives the gear train 18, is mounted on the shaft 20 that is driven by means which operates as a function of certain characteristics of a variable quantity that is being measured. The rotation that is imparted to the shaft 20 is employed for effecting the operation of the cumulative demand register in a manner that will now be set forth.

On the shaft 20 there is provided a pinion 44 which engages a gear wheel 45 on a shaft 46 that is mounted at one end 47 in a fixed bearing and at the other end 48 in a plate 49 that is rockably mounted at 50. A counterweight 51 is mounted on the plate 49 for urging a pinion 54, on the shaft 46, into driving engagement with a gear wheel 55 on a shaft 56. It will be understood that when the plate 49 is rocked about its axis at 50 in a clockwise direction, the pinion 54 is moved out of driving engagement with the gear wheel 55. There are two separate and distinct means for rocking the plate 49 to effect disengagement of the pinion 54 from the gear wheel 55, which will be described hereinafter.

Figure 2B:
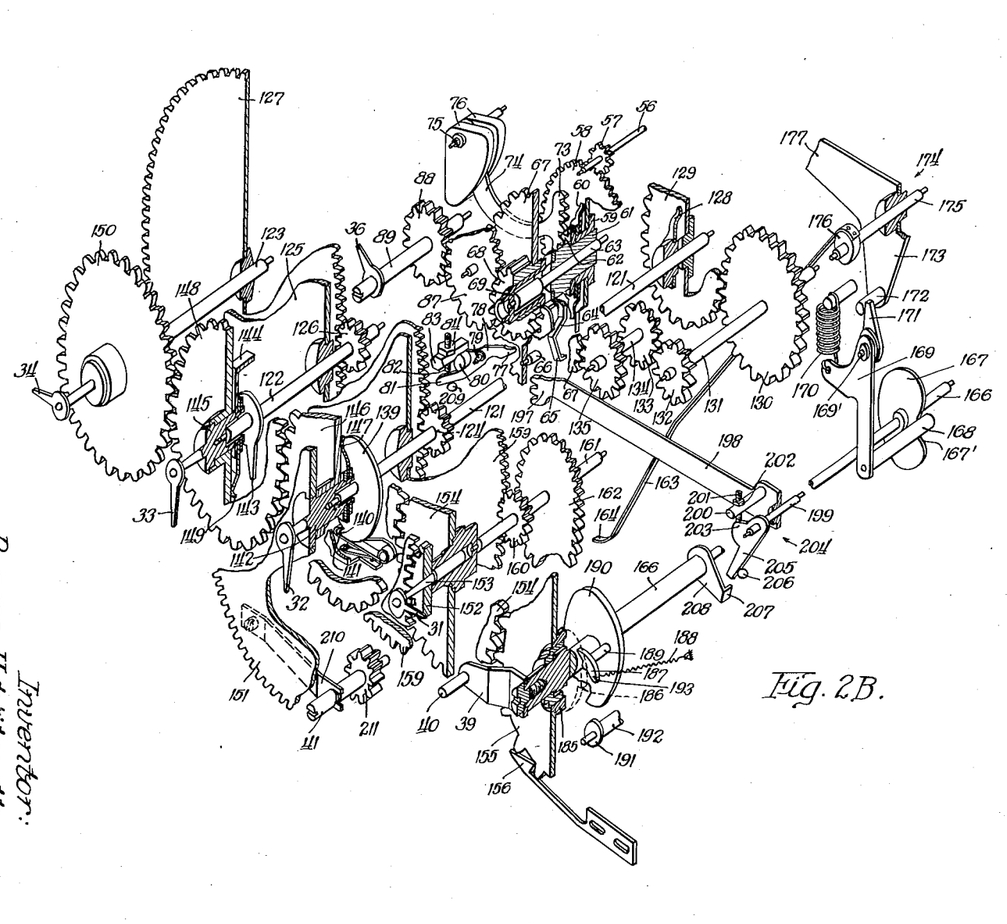

It will be observed that the shaft 56 extends from Figure 2A to Figure 2B and that, in the latter figure, a pinion 57 is mounted thereon and that it engages a gear wheel 58. The gear wheel 58 is mounted on a hub 59 and is urged into frictional engagement with a flange thereof by a spider spring 60. Ordinarily the gear wheel 58 and the hub 59 rotate conjointly but, in certain instances, the hub 59 may rotate relative to the gear wheel 58 to prevent damage to the gear train 18 forming a part of the meter register if the apparatus is subjected to a demand that is beyond its range of operation.

The hub 59 is mounted for rotation with a hub 61 which extends from a pinion 62 that is mounted for rotation on a shaft 63. The pinion 62 carries with it a pusher arm 64, the inturned end 65 of which is arranged to engage a stud 66 carried by a demand wheel 67. The pusher arm 64 corresponds to the pusher arm that is employed in the maximum demand registers of the prior art for advancing the maximum demand pointer along its scale. In like manner the demand wheel 67 corresponds to the maximum demand pointer and it is adapted to remain in the position to which it is operated by the pusher arm 64, the extent of movement of the demand wheel 67 during the demand period corresponding to the maximum demand in any demand interval during that period.

The demand wheel 67 is mounted for rotation with a pinion 68 on a hub 69 that is coaxial with the shaft 63.

When the pinion 54, Figure 2A, is moved out of engagement with the gear wheel 55, the pusher arm 64 is reset to its initial position. This is accomplished by means of a gear sector 73, Figure 2B, which meshes with the pinion 62 and which is carried by an arm 74 that is rockably mounted at 75. The arm 74 is provided with counterweights 76 which, when the driving engagement between the pinion 54 and the gear wheel 55 is released, urges the sector 73 downwardly and thereby rotates the pinion 62 and the pusher arm 64 in a counterclockwise direction.

The pusher arm 64 is stopped in its initial position when the inturned end 65 engages the upper face of the outer end 77 of a stop lever 78 that is rockably mounted at 79. A counterweight 80 is provided adjacent the tail end 81 of the stop lever 78 and is so arranged that the restoring force of the counterweights 76 on the pusher arm 64 is ineffective to rock the stop lever 78. When the demand pointers 31, 32, 33 and 34 are manually reset at the end of the demand period, sufficient additional force is applied to the pusher arm 64 to rock the stop lever 78 in a clockwise direction until the tail end 81 engages an adjusting screw 82 that is threaded in a support member 83 and locked in position by a lock nut 84. This further movement of the pusher arm 64 is provided to compensate for back lash in the gear train that is driven by the demand wheel 67, as will be apparent hereinafter.

It will be noted that the pinion 68, which rotates with the demand wheel 67, is arranged to drive through the gear wheels 87 and 88 the test dial pointer 36 which is mounted on a shaft 89 with the gear wheel 88. The movement of the test dial pointer 36 then corresponds to the movement of the demand wheel 67 during a demand period.

In Figure 2A of the drawings there is shown the mechanism for effecting the disengagement of the pinion 54 from the gear wheel 55 at the end of each demand interval, i. e., at the end of either fifteen minutes or thirty minutes, to permit the counterweights 76 (Figure 2B) to move the sector 73 downwardly for resetting the pusher arm 64 to its initial position in engagement with the end 77 of the stop lever 78. This mechanism will now be described.

Any suitable timing mechanism, such as the synchronous motor shown generally at 91, may be provided for measuring the demand intervals. As illustrated, the motor 91 is arranged to drive a worm 92 which is in engagement with a worm wheel 93 that drives through a gear train 94 a gear wheel 95. Preferably, the speed of the motor 91 and the reduction provided by the gear train 94 is such that the gear wheel 95 rotates once during each demand interval. In other words, the arrangement is preferably such that the gear wheel 95 rotates once every fifteen minutes or once every thirty minutes, as the case may be.

The gear wheel 95 is mounted for rotation on a hub 96 and is urged into frictional engagement with a flange 97 thereof by a coil compression spring 98. This frictional coupling is provided in order to permit manual rotation of cams 100 and 101, described hereinafter, so that the beginning of the demand interval can be set for a particular time.

The hub 96 is mounted for rotation with a shaft 99 that carries a pair of cams 100 and 101 that are spaced by a washer 102. A pair of levers 104 and 105 is provided for cooperating with the cams 100 and 101, respectively. The lever 104 is rockably mounted at 106 while the lever 105 is rockably mounted on the lever 104 at 107. The distance between the axis 107 of the lever 105 and the end 108 of the lever 104 adjacent the cam 100 is slightly greater than the distance between the axis 107 and the end 109 of the lever 105 adjacent the cam 101, so that, on rotation of the cams 100 and 101 in a clockwise direction, the end 109 of the lever 105 drops off of its cam 101 slightly in advance of the end 108 of the lever 104 dropping off of its cam 100. This arrangement then permits the lever 105 to rock relative to the lever 104, during which time the extension 111 of the lever 105 engages and lifts an arm 112 extending from the plate 49. The plate 49 moves with the arm 112 and thereby moves the pinion 54 out of engagement with the gear wheel 55. Since the shaft 46 is comparatively long and the movement thereof required to disengage the pinion 54 from the gear wheel 55 is relatively slight, it will be understood that this movement will take place even though the end 47 of the shaft 46 is mounted in a fixed bearing, sufficient clearance being provided in this bearing to permit this movement.

As soon as the end 108 of the lever 104 drops off of its cam 100, the extension 111 of the lever 105 is moved out of engagement with the arm 112 and the counterweight 51 then immediately swings the plate 49 in a counterclockwise direction to move the pinion 54 back into driving engagement with the gear wheel 55. The time that they are out of engagement is that required to move the cam 100 after the lever 105 has been released to release the lever 104.

The downward movement of the lever 105 is effected principally by a counterweight 113 assisted by a leaf spring 114.

With a view to preventing the cams 100 and 101 being advanced as a result of the movement of the levers 104 and 105, a spring finger 116 is provided for engaging the shoulder 97 of the hub 96.

The mechanism that is operated as a result of the forward movement of the demand wheel 67 will now be described. This is shown in Figure 2B and includes three shafts 121, 122 and 123 that are arranged to be rotated at successively slower speeds. These speed reductions are provided by a pinion 124 on the staff 121 engaging a gear wheel 125 on the staff 122 on which there is also mounted a pinion 126 meshing with a gear wheel 127 on the staff 123. The gear reduction is such that for each 100 revolutions of the staff 121, the staff 122 rotates ten times and the staff 123 rotates once. Obviously, any other suitable gear reduction can be employed but the one mentioned is preferred for obvious reasons.

The staff 121 is driven through a spider spring 128 by a gear wheel 129. The spider spring 128 forms a friction clutch between the staff 121 and the gear wheel 129 so that rotation of the latter is permitted while the former is held stationary during the resetting operation, as will be presently described.

The gear wheel 129 is driven by a gear wheel 130 mounted on a shaft 131 carrying a gear wheel 132. The gear wheel 132 meshes with a gear wheel 133 on a shaft 134 which carries a gear wheel 135 that meshes with and is driven by the demand wheel 67.

It will now be apparent that the staffs 121, 122 and 123 are rotated by the demand wheel 67 during a demand period through an extent that corresponds to the extent of movement of the demand wheel 67 during this period. Obviously, only a single staff 121 might be employed or more than three staffs might be employed, as conditions may warrant. It will be understood that, since the demand wheel 67 is advanced by the quantity measuring mechanism, i. e., the disc 27, the staffs 121, 122 and 123 are likewise advanced by the quantity measuring mechanism.

Now when the demand pointers 32, 33 and 34, which it will be recalled remain stationary during the demand period and during the advancement of the staffs 121, 122 and 123, are advanced at the end of the demand period so that their positions correspond to the positions of the staffs 121, 122 and 123, respectively, they will indicate the maximum demand that has occurred in the preceding demand period. The mechanism for advancing the demand pointers 32, 33 and 34 to the positions for indicating the maximum demand will now be described.

The staff 121 is provided with a ratchet wheel 139 having a single tooth 140. The tooth 140 is arranged so that it is free, when the wheel 139 is rotated in a counterclockwise direction, the only direction in which it is permitted to rotate, so that it slips past a spring pawl 141 that is mounted for rotation with a hub 142 on which the demand pointer 32 is also mounted. It will be understood that the spring pawl 141, hub 142, and demand pointer 32 rotate together as a single unit. It will also be understood that, during the demand period, they remain stationary while the ratchet wheel 139 rotates through one or more revolutions relative thereto.

The staff 122 is provided with a finger 143 that is positioned so that it can be engaged by a stop 144 that is carried by a hub 145 which also carries the demand pointer 33. The stop 144, together with the hub 145 and the demand pointer 33 are arranged to rotate together as a unit.

On the staff 123 there is provided an arm similar to the arm 143 on the staff 122 and the demand pointer 34 is provided, like the demand pointer 33, with a stop which corresponds to the stop 144. Since the construction is a duplicate of that for the demand 33, it is not shown.

Since it is intended that the staff 121 will be rotated through more than one revolution during a demand period, it is necessary to provide the pawl and ratchet arrangement as is provided by the ratchet wheel 139 and the spring pawl 141. However, since the staff 122 will not be rotated through more than a single revolution during a demand period, it is unnecessary to provide it with a pawl and ratchet arrangement. The simple finger and stop arrangement provided by the finger 143 and stop 144 is all that is necessary for the staff 122. Of course, since the staff 123 rotates at a much slower speed than does the staff 122, this arrangement will also suffice for it.

With a view to advancing the demand pointer 32 to a position corresponding to the position to which the staff 121 has been rotated during a demand period, a gear wheel 146 is provided and is rotatably mounted on the hub 142. A spring spider 147 serves to provide a friction drive between the gear wheel 146 and the hub 142. On rotation of the gear wheel 146 the demand pointer 32 is rotated in the same direction that the staff 121 is rotated until the spring pawl 141 engages and is stopped by the tooth 140 of the ratchet wheel 139. Further movement of the demand pointer 32 is thereby prevented but the gear wheel 146 is permitted to rotated further because of the friction drive provided by the spring spider 147.

For advancing the demand pointer 33 to a position corresponding to the position of the staff 122, a gear wheel 148 is provided and is rotatably mounted on the hub 145. A spring spider 149 provides a friction drive between the gear wheel 148 and the demand pointer 33 so that on rotation of the former the stop 144 is carried into engagement with the finger 143. When this engagement occurs, no further movement of the demand pointer 33 is permitted. However, because of the frictional engagement provided by the spring spider 149, the gear wheel 148 can continue to rotate.

A gear wheel 150 is provided for advancing the demand pointer 34 to a position corresponding to that of the staff 123. Since the relationship between the gear wheel 150 and its demand pointer 34 is the same as the relation between the gear wheel 148 and its demand pointer 33, a description thereof is not set forth herein.

The demand pointer 31 is advanced with the demand pointer 32 but at a higher speed. It will be observed that a gear wheel 151 is provided on the hub 142 for rotation therewith and that it meshes with a pinion 152 that is fastened on a shaft 153 which carries the demand pointer 31. The ratio between the gear wheel 151 and the pinion 152 is preferably such that for each revolution of the former the latter makes ten revolutions.

Since it is necessary to rotate the demand pointers 32, 33 and 34 through less than a complete revolution in order to advance them into positions corresponding to their respective staffs 121, 122 and 123, the gear wheels 146, 148 and 150, which effect this advancement, and which are placed in driving engagement, can have the same numbers of teeth.

The gear wheels 146, 148 and 150 are driven in the order named through an idler gear wheel 154 by a gear wheel 155 that is rotated by the manual reset arm 39 in a manner that will be hereinafter set forth.

A dog 156 biased into engagement with the teeth of the gear wheel 155 is arranged to permit rotation thereof in a forward or a counterclockwise direction but prevents rotation thereof in a reverse direction.

While the demand pointers 31, 32, 33 and 34 are being advanced at the end of a demand period to positions corresponding to the positions to which the staffs 121, 122 and 123 have been advanced by the demand wheel 67, it is desirable that the staffs 121, 122 and 123 be blocked so that the demand pointers 31, 32, 33 and 34 can be precisely advanced to positions corresponding exactly with the maximum demand during the preceding demand period. For this purpose a blocking mechanism for the staffs 121, 122 and 123 is provided that is automatically operated at the beginning of the resetting cycle to prevent movement of these staffs during the cycle. One manner of effecting this blocking action is to provide a gear wheel 159 on the staff 121 meshing with a pinion 160 on a shaft 161 that also carries a gear wheel 162. At the beginning of the resetting cycle a blocking spring 163 is moved so that its tip 164 engages between a pair of teeth of the gear wheel 162 so that rotation thereof is prevented as long as the tip 164 is thus engaged. Since the gear wheel 162 is fastened onto the shaft 161 and since this shaft and the staffs 121, 122 and 123 are positively intergeared, no movement of the staffs 121, 122 and 123 is permitted as long as the blocking spring 163 occupies the blocking position. Of course, the blocking spring 163 is moved out of engagement with the gear wheel 162 to permit further advance of the staffs 121, 122 and 123 during the next demand period. The mechanism for operating the blocking spring 163 will be presently described.

It will be recalled that the manual reset arm 39 is provided for resetting the cumulative demand register at the end of a demand period. As shown in Figure 2B, the manual reset arm 39 is mounted for rotation with a shaft 166 that carries close to its rear end a heart-shaped cam 167 in the V-shaped portion 167' of which a pin 168 is normally positioned. The pin 168 is carried by a lever 169 that is biased by a coil tension spring 170 so that the pin 168 always remains in contact engagement with the periphery of the heart-shaped cam 167. It will be understood that the initial movement of the manual reset arm 39 in a counterclockwise direction immediately lifts the pin 168 out of the V-shaped section 167' and a corresponding movement of the lever 169 is effected. On the completion of a rotation of the heart-shaped cam 167, the V-shaped portion 167' is effective to automatically center the shaft 166 and the manual reset arm 39 in the initial position, as will be readily understood, thereby making it unnecessary for an accurate alignment of the manually operable means extending through the meter cover for engagement with the manual reset arm 39.

The lever 169 is rockably mounted at 169' and it carries a finger 171 that engages a pin 172 on the downwardly extending leg 173 of a blocking lever, shown generally at 174.

It will be observed that the blocking lever 174 is mounted for rotation with a shaft 175. A hub 176 is provided on an extension of the shaft 175 to which, it will be noted, the blocking spring 163 is secured. It will now be understood that the blocking spring 163 is moved so that its tip 164 engages the gear wheel 162 as soon as the blocking lever 174 has been rotated during the beginning of the resetting cycle by the movement of the pin 168 out of the V-shaped portion 167' of the heart-shaped cam 167.

The blocking lever 174 is provided with a generally horizontal leg 177 which extends from Figure 2B to Figure 2A. At its extreme end 178 the leg 177 of the blocking lever 174 is arranged to engage the pin 112 carried by the plate 49. The plate 49 is moved to disengage the pinion 54 from the gear wheel 55 so that the driving connection to the cumulative demand register will be interrupted.

It will be recalled that the levers 104 and 105 effect a similar movement of the plate 49. However, they are arranged to interrupt the driving engagement of the pinion 54 with the gear wheel 55 only momentarily, so that there will be a minimum time between demand intervals. However, at the end of a demand period, the plate 49 is held in the disengaging position by the end 178 of the leg 177 of the blocking lever 174 for a time which is a substantial portion of a demand interval, as will be presently apparent.

A counterweight 179 is provided, as illustrated, on the leg 177 of the blocking lever 174 in order to urge the same to the normal or releasing position.

It is desirable to hold the plate 49 in the position where the pinion 54 is disengaged from the gear wheel 55 for an appreciable time interval after the demand pointers 31, 32, 33 and 34 have been advanced by rotation of the manual reset arm 39. If this time delay were not provided, then it would be possible for the meter reader to effect a second resetting operation shortly after he had completed the first one, with the result that the demand in the brief interval would be added to the previously registered cumulative demand. This is undesirable for obvious reasons.

With a view to providing this desired time interval the leg 177 of the blocking lever 174 is provided with a depending finger 180 having a cam surface 181 that engages the surface of the interval cam shaft 99 at 182, when the blocking lever 174 is rotated in a clockwise direction to the resetting position by the heart-shaped cam 167 as previously described. The engagement between the cam surface 181 and the surface 182 of the shaft is such that the blocking lever 174 is held in the resetting position after the heart-shaped cam 167 has been returned to its normal position. This operation is permitted since the finger 171 is not fastened to the pin 172.

Now it will be recalled that the interval cam shaft 99 is rotated at a speed of one revolution during each demand interval. The cam surface 181 is so arranged that the blocking lever 174 will be released from the resetting position in about one-third of a revolution of the interval cam shaft 99. This then provides an interval of from five to ten minutes during which the manual reset arm 39 can be operated through as many cycles of operation as the meter reader may desire, but none of them after the first will be effective to advance the demand pointers 31, 32, 33 and 34. At the end of this time delay period, the blocking lever 174 is released and it drops to the normal position. The blocking spring 163 then is moved out of engagement with the gear wheel 162 and, since the plate 49 has been released, the pinion 54 is again placed in driving engagement with the gear wheel 55.

Figure 4:
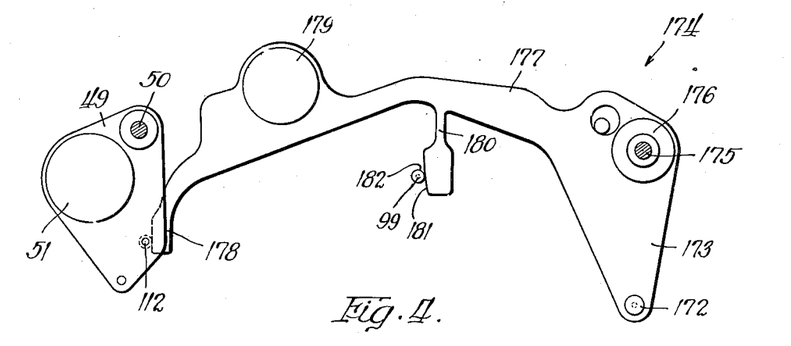
Figure 4 is a detail view, showing the blocking lever in elevation, illustrating the relation between the interval cam shaft and the blocking lever whereby a subsequent advancement of the cumulative pointers is prevented until a predetermined interval has elapsed after they have once been advanced.

In Figure 4 of the drawings the blocking lever 174 is shown in side elevation and its relationship to the plate 49 and to the surface 182 of the shaft 99 is more clearly illustrated.

It will be recalled that the gear wheel 155 which drives the gear wheels 146, 148 and 150 through the idler gear wheel 154 advances the demand pointers 32, 33 and 34 to positions corresponding to the positions to which the staffs 121, 122 and 123 have been operated by the demand wheel 67. It is desirable that the movement of the gear wheel 155 be delayed until after the blocking spring 163 has arrested further movement of the staffs 121, 122 and 123 and the driving engagement between the pinion 54 and the gear wheel 55 has been interrupted, so that the demand pointers 31, 32, 33 and 34 can be advanced precisely and accurately to the new positions representing the maximum demand that has occurred in the preceding demand period. In order to effect this desired sequence of operations the gear wheel 155 is mounted for rotation with a hub 185 that is provided with teeth 186 around its periphery. In the embodiment shown four teeth 186 are provided and they are arranged to be engaged by a pawl 187 that is resiliently urged into engagement by any suitable means, such as a spring 188. It will be understood that the coil tension spring 188 is shown for illustrative purposes only, and that any other suitable form of resilient means can be employed for urging the pawl 187 into engagement with the hub 185. The pawl 187 is rockably mounted on an arbor 189 that extends from a disc 190 fastened onto the shaft 166. A collar 191 mounted on a stationary shaft 192 is arranged in the path of the tail 193 of the pawl 187 so that near the completion of a revolution of the manual reset arm 39, the forward end of the pawl 187 is caused to disengage the particular tooth 186 with which it may be in engagement, thereby continuing to the normal position out of driving engagement with the hub 185.

It will now be understood that the initial movement of the manual reset arm 39 is ineffective to cause rotation of the gear wheel 155 for advancing the demand pointers 31, 32, 33 and 34 until the forward end of the pawl 187 engages the next tooth 186 on the hub 185. During this interval, the heart-shaped cam 167 has rotated so that the pin 168 will have been moved out of the V-shaped portion 167' and during this interval the blocking spring 163 engages the gear wheel 162 and the driving engagement between the pinion 54 and the gear wheel 55 is interrupted.

It will be understood that the demand wheel 67 is reset to the initial position at the end of a demand period when the demand pointers 31, 32, 33 and 34 are advanced. However, the resetting of the demand wheel 67 is effected independently of the advancement of the demand pointers 31, 32, 33 and 34. It so happens that both operations are effected by the single rotation of the manual reset arm 39 but, nevertheless, the resetting of the one and the advancement of the other are not interrelated except in so far as it happens that both are effected by the same driving means. In other words, they are not synchronized.

With a view to resetting the demand wheel 67 to its initial position a gear sector 197 is provided in engagement with the pinion 68 which, it will be recalled, rotates with the demand wheel 67. The gear sector 197 is moved in a downward direction when the demand wheel 67 is advanced. It is moved in a reverse direction to reset the demand wheel 67, as will be readily understood.

The gear sector 197 is carried at one end of a sector arm 198 that is rockably mounted on a shaft 199. The pin 200 extends from the sector arm 198 and carries an adjusting screw 201 that may be locked in position by a lock nut 202. The adjusting screw 201 is arranged to engage one leg 203 of a lever, shown generally at 204, which includes a leg 205 that is limited in its movement by a stop 206.

The leg 205 of the lever 204 is arranged to be engaged by the outturned end 207 of an arm 208 which is carried by the shaft 166. This engagement takes place some time after the blocking spring 163 has been moved to block further rotation of the shafts 121, 122 and 123 and after the driving engagement between the pinion 54 and the gear wheel 55 has been disrupted. The engagement can take place after the pawl 187 engages one of the teeth 186 and initiates the forward movement of the demand pointers 31, 32, 33 and 34, since there is no relation between the advancement of these pointers and the resetting of the demand wheel 67 to its initial position.

When the driving engagement between the pinion 54 and the gear wheel 55 is disrupted by movement of the plate 49 on operation of the blocking lever 174 during the resetting operation, the pusher arm 64 is restored to its initial position automatically by the counterweights 76. The initial position of the pusher arm 64 is determined by the position of the end 77 of the stop lever 78. When the outturned end 65 of the pusher arm 64 engages the end 77 of the stop lever 78, then the pusher arm 64 is considered to be in its initial position. The counterweight 80 on the stop lever 78 is of such a character that no permanent displacement of the stop lever takes place when it is engaged solely by the pusher arm 64.

Figure 3:
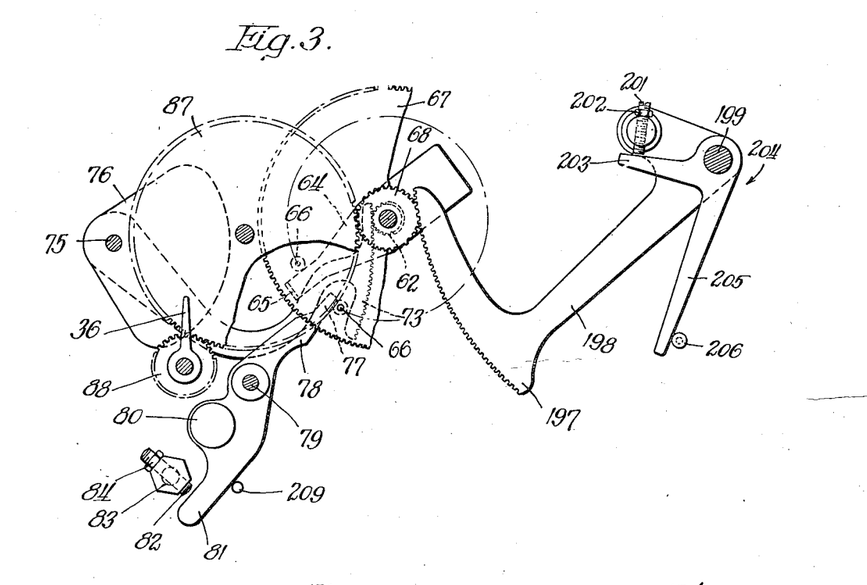
Figure 3 is a detail view, showing the demand wheel in elevation and the arrangement of the associated parts for compensating for back lash.

Now when the demand wheel 67 is reset by movement of the gear sector 197, it carries with it the stud 66 against which the outturned end 65 of the pusher arm 64 reacts in advancing the demand wheel during a demand interval. In its initial position the stud 66 bears against the pusher arm 64 and urges it against the end 77 of the stop lever 78 with a force in addition to that which is provided by the counterweights 76. The relationship of the various parts concerned with the resetting of the demand wheel 67 is more clearly illustrated in Figure 3 of the drawings.

When the demand wheel 67 is reset to its initial position while the blocking spring 163 prevents rotation of the gear wheel 162 and the associated parts, as previously described, it will be understood that there is a certain amount of back lash between the demand wheel 67 and the gear wheel 162 that is blocked by the blocking spring 163. It will be understood that a certain amount of back lash is inherently present in a geared construction as disclosed. The initial movement of the demand wheel 67 in the resetting direction first takes up the back lash through the gear wheels and pinions that may be enumerated in consecutive order from the demand wheel 67 through 135, 133, 132, 130, 129, 159, 160, to the gear wheel 162 that is blocked by the blocking spring 163. When this back lash is taken up, then the spider 128 permits movement of the gear wheel 129 relative to the blocked staff 121 for continued movement of the demand wheel 67 in the resetting direction.

Compensation for this back lash is provided by permitting the pusher arm 64 to be moved slightly past what is otherwise its normal initial position at the beginning of each demand interval by an amount that is determined by the gap between the tail end 81 of the stop lever 78 and the lower end of the adjusting screw 82. Then for the first demand interval in the next demand period the pusher arm will start from a position slightly in advance of its normal position to take up this back lash.

The movement of the stop lever 78 in a counter-clockwise direction when it is not engaged by the pusher arm 64 can be limited by any suitable means, such as by a stop 209.

The sequence of operation of the cumulative demand register will now be briefly reviewed in order to provide a complete description in one portion hereof where the various functions will be more clearly correlated.

The pointers 11, 12, 13 and 14 will be operated continuously without regard to any functioning of the cumulative demand register. The operation of this register will be substantially as follows.

At the beginning of a demand period after the demand pointers 31, 32, 33 and 34 have been reset, the pusher arm 64 is advanced in accordance with the demand during the next demand interval and it carries with it the stud 66 and thereby the demand wheel 67. The pusher arm 64 is periodically reset under the control of the timing mechanism including the synchronous motor 91. The demand wheel 67 remains in the position to which it has been operated by the maximum movement of the pusher arm 64. Any movement of the pusher arm 64 less than this maximum movement has no effect on the operation of the demand wheel 67.

The demand wheel 67 advances the staffs 121, 122 and 123 through the interconnecting gear train, so that they take up positions corresponding to the position to which the demand wheel 67 has been advanced through the maximum extent of movement of the pusher arm 64, which corresponds to the maximum demand during any demand interval in the demand period. The test dial pointer 36 is also advanced with the advance of the demand wheel 67. During the demand period, however, the demand pointers 31, 32, 33 and 34 remain stationary in the positions to which they have been operated at the end of the preceding demand period. It will be understood that this permits a checking of the maximum demand reading for the preceding demand period during the next demand period.

When the register is to be read, the meter man rotates the manual reset arm 39 through one complete revolution. As a result of this, further movement of the staffs 121, 122 and 123 is blocked by the blocking spring 163 and the driving connection to the demand wheel 67 is interrupted by moving the pinion 54 out of engagement with the gear wheel 55. The pawl 187 then engages one of the teeth 186 and the gear wheel 155 is rotated to rotate through the idler gear wheel 154 the gear wheels 146, 148 and 150 to advance the demand pointers 32, 33 and 34 to positions corresponding to the positions to which the staffs 121, 122 and 123 have been rotated, and in which positions they are blocked by the blocking spring 163. During this forward movement of the demand pointers 32, 33 and 34, the demand pointer 31 is advanced at a speed that is ten times that of the speed of movement of the demand pointer 32.

The demand wheel 67 is reset to an initial position in which compensation is provided for back lash between it and the gear wheel 162, as previously described. The driving connection to the pusher arm 64 and the demand wheel 67 is maintained interrupted and the staffs 121, 122 and 123 remain in the blocked condition until after the blocking lever 174 is released by movement of the cam surface 181 of the finger 180 out of frictional engagement with the surface 182 of the interval cam shaft 99. When the blocking lever 174 is released, the cumulative register is again placed in driving connection with the quantity measuring mechanism.

It was previously indicated that the reset member 41 is provided for moving the demand pointers 31, 32, 33 and 34 in a reverse direction after certain tests have been made on the register. As shown in Figure 2B, the reset member 41 is carried by a spring strip 210 and has mounted thereon a pinion 211 that can be placed in driving engagement with the gear wheel 159 on the staff 121. On rotation of the reset member 41 in the direction indicated by the arrow associated therewith in Figure 1, it is possible to restore the demand pointers 31, 32, 33 and 34 to the positions that they occupied at the beginning of the test. On release of the reset member 41, the spring strip 210 moves the pinion 211 out of driving engagement with the gear wheel 159.

Not only does the stop lever 78 compensate for back lash, as described but it also can be used to counteract the tendency, from whatever cause such as the random meshing of the pinion 54 with the gear wheel 55, for the register indication to be low.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. Means for indicating a measurement comprising, in combination, a first resettable member movable from an initial position through an extent depending upon a varying quantity, means for periodically resetting said first member to its initial position, a second resettable member movable from an initial position through an extent depending upon the maximum extent of movement of said first member during a plurality of resetting periods, means for resetting said second member to its initial position, a member unidirectionally movable through an extent depending upon the maximum extent of movement of said second member, an indicator and a scale relative to which the indicator moves, and means operable independently of said unidirectionally movable member for moving said indicator into a position corresponding to that of said unidirectionally movable member in which position the measurement is indicated.

2. Means for indicating a measurement comprising, in combination, a first resettable member movable from an initial position through an extent depending upon a varying quantity, means for periodically resetting said first member to its initial position, a second resettable member movable from an initial position through an extent depending upon the maximum extent of movement of said first member during a plurality of resetting periods, a third member advanced with the forward movement of and through an extent depending upon the maximum extent of movement of said second member, an indicator and a scale relative to which the indicator moves, and manually operable means arranged and adapted to reset said second member to its initial position and to advance said indicator in the same direction as said third member is advanced to a position corresponding thereto whereupon the measurement is indicated.

3. Means for indicating a measurement comprising, in combination a resettable member movable from an initial position through an extent depending upon a varying quantity, means for periodically resetting said member to its initial position, a member movable through an extent depending upon the maximum extent of movement of said resettable member during a plurality of resetting periods, an indicator and a scale adjacent to which the indicator moves, said indicator being movable into a position corresponding to that of the last named movable member in which position the measurement is indicated, and means for preventing further movement of said indicator after the same has been moved to its indicating position until a predetermined interval has elapsed.

4. Means for indicating a measurement comprising, in combination, a first resettable member movable from an initial position through an extent depending upon a varying quantity, means for periodically resetting said first member to its initial position, a second resettable member movable from an initial position through an extent depending upon the maximum extent of movement of said first member during a plurality of resetting periods, means for resetting said second member to its initial position, a member unidirectionally movable through an extent depending upon the maximum extent of movement of said second member, an indicator and a scale relative to which the indicator moves, means for moving said indicator into a position corresponding to that of said unidirectionally movable member in which position the measurement is indicated, and means for preventing movement of said unidirectionally movable member while said indicator is being moved to its indicating position.

5. Means for indicating a measurement comprising, in combination, a first resettable member movable from an initial position through an extent depending upon a varying quantity, means for periodically resetting said first member to its initial position, a second resettable member movable from an initial position through an extent depending upon the maximum extent of movement of said first member during a plurality of resetting periods, a third member advanced with the forward movement of and through an extent depending upon the maximum extent of movement of said second member, an indicator and a scale relative to which the indicator moves, manually operable means arranged and adapted to reset said second member to its initial position and to advance said indicator in the same direction as said third member is advanced to a position corresponding thereto whereupon the measurement is indicated, and means operated by said manually operable means for preventing movement of said third member while said indicator is being advanced to its indicating position.

6. Means for indicating a measurement comprising, in combination, a pusher arm rotatable from an initial position through an extent depending upon a varying quantity, biased stop means engageable by said pusher arm for determining its initial position, means for periodically resetting said pusher arm to its initial position in engagement with said biased stop means, a demand wheel driven from an initial position by said pusher arm and disposed to remain in the position to which it is driven thereby, a staff, a gear train operatively interconnecting said demand wheel and said staff for rotating the latter through an extent depending upon the maximum extent of movement of the former, means for resetting said demand wheel to its initial position by rotating the same in a reverse direction carrying therewith said pusher arm against said biased stop means and moving the same past the position thereof corresponding to the initial position of said pusher arm, an indicator and a scale relative to which the indicator rotates, and means for rotating said indicator into a position corresponding to that of said staff in which position the measurement is indicated.

7. Means for indicating a measurement comprising, in combination, a pusher arm rotatable from an initial position through an extent depending upon a varying quantity, biased stop means engageable by said pusher arm for determining its initial position, means for periodically resetting said pusher arm to its initial position in engagement with said biased stop means, a demand wheel driven from an initial position by said pusher arm and disposed to remain in the position to which it is driven thereby, a staff, a gear train operatively interconnecting said demand wheel and said staff for rotating the latter through an extent depending upon the maximum extent of movement of the former, means for resetting said demand wheel to its initial position by rotating the same in a reverse direction carrying therewith said pusher arm against said biased stop means and moving the same past the position thereof corresponding to the initial position of said pusher arm through an extent depending substantially upon the amount of back lash in said gear train whereby compensation for the same is provided, an indicator and a scale relative to which the indicator rotates, means for rotating said indicator into a position corresponding to that of said staff in which position the measurement is indicated, and means for preventing rotation of said staff while said indicator is being rotated to its indicating position.

8. Means for indicating a measurement comprising, in combination, a pusher arm rotatable from an initial position through an extent depending upon a varying quantity, biased stop means engageable by said pusher arm for determining its initial position, means for periodically resetting said pusher arm to its initial position in engagement with said biased stop means, a demand wheel driven from an initial position by said pusher arm and disposed to remain in the position to which it is driven thereby, a staff, a gear train operatively interconnecting said demand wheel and said staff for rotating the latter through an extent depending upon the maximum extent of movement of the former, means for resetting said demand wheel to its initial position by rotating the same in a reverse direction carrying therewith said pusher arm against said biased stop means and moving the same past the position thereof corresponding to the initial position of said pusher arm through an extent depending substantially upon the amount of back lash in said gear train whereby compensation for the same is provided, an indicator and a scale relative to which the indicator rotates, means for rotating said indicator into a position corresponding to that of said staff in which position the measurement is indicated, and means for preventing further rotation of said indicator after the same has been rotated to its indicating position until a predetermined interval has elapsed.

9. Means for indicating a measurement comprising, in combination, a pusher arm rotatable from an initial position through an extent depending upon a varying quantity, biased stop means engageable by said pusher arm for determining its initial position, means for periodically resetting said pusher arm to its initial position in engagement with said biased stop means, a demand wheel driven from an initial position by said pusher arm and disposed to remain in the position to which it is driven thereby, a staff, a gear train operatively interconnecting said demand wheel and said staff for rotating the latter through an extent depending upon the maximum extent of movement of the former, an indicator and a scale relative to which the indicator rotates, and manually operable means arranged and adapted to reset said demand wheel to its initial position by rotating the same in a reverse direction carrying therewith said pusher arm against said biased stop means and moving the same past the position thereof corresponding to the initial position of said pusher arm through an extent depending substantially upon the amount of back lash in said gear train and to rotate said indicator in the same direction as said staff is rotated to a position corresponding thereto whereupon the measurement is indicated.

10. Means for indicating a measurement comprising, in combination, a pusher arm, means having driving connection with said pusher arm for rotating the same from an initial position through an extent depending upon a varying quantity, means for periodically interrupting said driving connection whereupon said pusher arm is returned to its initial position, a demand wheel driven from an initial position by said pusher arm and disposed to remain in the position to which it is driven thereby, a staff rotated by said demand wheel through an extent depending upon the maximum extent of movement of said demand wheel, an indicator and a scale relative to which the indicator rotates, and manually operable means arranged and adapted to reset said demand wheel to its initial position and independently thereof to rotate said indicator to a position corresponding to that of said staff.

11. Means for indicating a measurement comprising, in combination, a pusher arm, means having driving connection with said pusher arm for rotating the same from an initial position through an extent depending upon a varying quantity, means for periodically interrupting said driving connection whereupon said pusher arm is returned to its initial position, a demand wheel driven from an initial position by said pusher arm and disposed to remain in the position to which it is driven thereby, a staff rotated by said demand wheel through an extent depending upon the maximum extent of movement of said demand wheel, an indicator and a scale relative to which the indicator rotates, manually operable means arranged and adapted to reset said demand wheel to its initial position and independently thereof to rotate said indicator to a position corresponding to that of said staff, and a blocking member moved into operative engagement with said staff by said manually operable means for preventing rotation thereof while said indicator is being rotated to its indicating position.

12. Means for indicating a measurement comprising, in combination, a pusher arm, means having driving connection with said pusher arm for rotating the same from an initial position through an extent depending upon a varying quantity, means for periodically interrupting said driving connection whereupon said pusher arm is returned to its initial position, a demand wheel driven from an initial position by said pusher arm and disposed to remain in the position to which it is driven thereby, a staff rotated by said demand wheel through an extent depending upon the maximum extent of movement of said demand wheel, indicating means including first and second indicators geared together in such manner that the second indicator makes ten revolutions for each revolution of the first indicator and scales relative to which these indicators rotate, and manually operable means arranged and adapted to reset said demand wheel to its initial position and independently thereof to rotate said indicators to positions corresponding to the position of said staff.

13. Means for indicating a measurement comprising, in combination, a resettable member movable from an initial position through an extent depending upon a varying quantity, means for periodically resetting said member to its initial position, a plurality of rotatable members taking up their positions according to the maximum extent of movement of said resettable member during a plurality of resetting periods; indicating means corresponding to each of said rotatable members and movable independently thereof, each indicating means including a rotatable indicator and a scale adjacent to which the indicator rotates, and means for moving each indicator into a position corresponding to that of the rotatable member individual thereto in which positions the measurement is indicated.

14. Means for indicating a measurement comprising, in combination, a first resettable member movable from an initial position through an extent depending upon a varying quantity, means for periodically resetting said first member to its initial position, a second resettable member movable from an initial position through an extent depending upon the maximum extent of movement of said first member during a plurality of resetting periods, means for resetting said second member to its initial position, a plurality of rotatable members taking up their positions according to the maximum extent of movement of said second member, indicating means corresponding to each of said rotatable members, each indicating means including a rotatable pointer and a scale adjacent to which the pointer rotates; and means for moving said pointers into positions corresponding to the positions of the rotatable members individual thereto in which positions the pointers indicate the advance of said second member prior to resetting thereof.

15. Means for indicating a measurement comprising, in combination, a first resettable member movable from an initial position through an extent depending upon a varying quantity, means for periodically resetting said first member to its initial position, a second resettable member movable from an initial position through an extent depending upon the maximum extent of movement of said first member during a plurality of resetting periods, a plurality of rotatable members each after the first being driven by the preceding member at a successively slower speed with the first rotatable member being advanced with the forward movement of and through an extent depending upon the maximum extent of movement of said second member; indicating means corresponding to each of said rotatable members, each indicating means including a rotatable pointer and a scale adjacent to which the pointer rotates; and manually operable means arranged and adapted to reset said second member to its initial position and to advance said pointers in the same direction as said rotatable members are advanced to positions corresponding to their positions whereupon the pointers indicate the advance of said second member and thereby the measurement.

16. Means for indicating a measurement comprising, in combination, a pusher arm, means having driving connection with said pusher arm for rotating the same from an initial position through an extent depending upon a varying quantity, means for periodically interrupting said driving connection whereupon said pusher arm is returned to its initial position, a demand wheel driven from an initial position by said pusher arm and disposed to remain in the position to which it is driven thereby, a plurality of staffs each after the first being driven by the preceding staff at one tenth of the speed of the preceding staff with the first staff being rotated with the forward movement of and through an extent depending upon the maximum extent of movement of said demand wheel; indicating means corresponding to each of said staffs, each indicating means including a rotatable pointer and a scale adjacent to which the pointer rotates, said pointers being intergeared to rotate at the same speed with non-positive driving means between the gearing and the pointers; and manually operable means arranged and adapted to reset said demand wheel to its initial position and independently thereof to rotate said pointers to positions corresponding to the positions of the staffs individual thereto.

17. Means for indicating a measurement comprising, in combination, a pusher arm, means having driving connection with said pusher arm for rotating the same from an initial position through an extent depending upon a varying quantity, means for periodically interrupting said driving connection whereupon said pusher arm is returned to its initial position, a demand wheel driven from an initial position by said pusher arm and disposed to remain in the position to which it is driven thereby, a plurality of staffs each after the first being driven by the preceding staff at one tenth of the speed of the preceding staff with the first staff being rotated with the forward movement of and through an extent depending upon the maximum extent of movement of said demand wheel; indicating means corresponding to each of said staffs, each indicating means including a rotatable pointer and a scale adjacent to which the pointer rotates, said pointers being intergeared to rotate at the same speed with non-positive driving means between the gearing and the pointers; manually operable means arranged and adapted to reset said demand wheel to its initial position and independently thereof to rotate said pointers to positions corresponding to the positions of the staffs individual thereto, and a blocking member moved into operative engagement with said staffs by said manually operable means for preventing rotation thereof while said pointers are being rotated into registration therewith.

ROSCOE H. WILMETH.